United States Patent
Noone et al.

Patent Number: 5,678,611
Date of Patent: Oct. 21, 1997

[54] MULTI-LAYER FUEL AND VAPOR TUBE

[75] Inventors: David L. Noone, Southfield; Frank L. Mitchell, Rochester, both of Mich.

[73] Assignee: ITT Corporation, New York, N.Y.

[21] Appl. No.: 897,376

[22] Filed: Jun. 11, 1992

Related U.S. Application Data

[63] Continuation-in-part of Ser. No. 868,754, Apr. 14, 1992.
[51] Int. Cl.$^6$ ................................................. F16H 11/02
[52] U.S. Cl. ................. 138/137; 138/140; 138/DIG. 3; 138/DIG. 7; 361/215
[58] Field of Search .................................. 138/124, 125, 138/126, 127, 137, 138, 140, 141, 177, DIG. 1, DIG. 3, DIG. 7; 361/215

[56] References Cited

U.S. PATENT DOCUMENTS

| | | | |
|---|---|---|---|
| 3,070,132 | 12/1962 | Sheridan | 361/215 |
| 3,473,087 | 10/1969 | Slade | 361/215 |
| 3,561,493 | 2/1971 | Maillard et al. | 138/137 |
| 3,828,112 | 8/1974 | Johansen et al. | 361/215 |
| 3,907,955 | 9/1975 | Viennot | 361/215 |
| 4,059,847 | 11/1977 | Phillips et al. | 361/215 |
| 4,272,585 | 6/1981 | Strassel | 138/137 |
| 4,330,017 | 5/1982 | Satoh et al. | 138/137 |
| 4,675,780 | 6/1987 | Barnes et al. | 361/215 |
| 4,685,090 | 8/1987 | Krevor | 138/137 |
| 4,880,036 | 11/1989 | Kitami et al. | 138/137 |
| 4,887,647 | 12/1989 | Igarshi et al. | 138/137 |
| 4,984,604 | 1/1991 | Nishimura | 138/137 |
| 5,019,309 | 5/1991 | Brunnhofer . | |
| 5,038,833 | 8/1991 | Brunnhofer . | |
| 5,076,329 | 12/1991 | Brunnhofer . | |
| 5,112,692 | 5/1992 | Strassel et al. . | |
| 5,142,782 | 9/1992 | Martucci | 138/125 |
| 5,143,122 | 9/1992 | Adkins | 361/215 |

FOREIGN PATENT DOCUMENTS

| | | |
|---|---|---|
| 2577168 | 8/1986 | Germany . |
| 2577564 | 8/1986 | Germany . |
| 3821723 | 9/1989 | Germany . |
| 4001126 | 12/1990 | Germany . |
| 4006870 | 4/1991 | Germany . |
| 3942353 | 6/1991 | Germany . |
| 3942354 | 6/1991 | Germany . |
| 4006870 | 7/1991 | Germany . |
| 9007303 | 7/1991 | Germany . |
| 2204376 | 11/1988 | United Kingdom . |

OTHER PUBLICATIONS

Kirk–Othmer Encyclopedia of Chemical Technology, (3rd. Ed) vol. 18, (New York, John Wiley & Son) 1982 p. 407.

Margolis, James M. (ed), Conductive Polymers and Plastics, (New York, Chapman & Hall) 1989 pp. 119–174.

*Primary Examiner*—James E. Bryant, III
*Attorney, Agent, or Firm*—Thomas N. Twomey; J. Gordon Lewis

[57] ABSTRACT

A layered tubing for use in a motor vehicle composed of a thick outer tubing having an inner and an outer face, the outer tubing made of an extrudable thermoplastic such as a polyamide such as Nylon 6; a thin intermediate bonding layer bonded to the inner face of the thick outer layer, the bonding layer composed of an extrudable melt-processible thermoplastic capable of sufficiently permanent laminar adhesion to the polyamide outer tubing; and an inner hydrocarbon barrier layer bonded to the intermediate bonding layer, the inner layer composed of an extrudable, melt processible thermoplastic capable of sufficiently permanent laminar adhesion with the intermediate bonding layer, the thermoplastic containing as a major constituent a fluoroplastic such as polychlorotrifluoroethylene, ethylene tetrafluoroethylene copolymers and the like.

20 Claims, 2 Drawing Sheets

MULTI-LAYER FUEL AND VAPOR TUBE

I. RELATED APPLICATIONS

This application is a continuation-in-part of Ser. No. 07/868,754, filed Apr. 14, 1992 currently pending before the United States Patent and Trademark Office. This application is one of a series of four applications dispatched for filing in the United States Patent and Trademark Office on Jun. 11, 1992 which can be identified by our reference numbers: AHBC4048; AHBC4049; and AHBC4050, respectively.

II. FIELD OF THE INVENTION

The present invention relates to a hose for use in a motor vehicle. More particularly, the present invention relates to a multi-layer hose which can be employed as a fuel line or vapor recovery line in a motor vehicle.

III. BACKGROUND OF THE INVENTION

Single layer fuel lines and vapor return lines of synthetic materials such as polyamides have been proposed and employed in the past. Fuel lines employing such materials generally have lengths of at least several meters. It is important that the line, once installed, not materially change during the length of operation, either by shrinkage or elongation or as a result of the stresses to which the line may be subject during use.

It is also becoming increasingly important that the lines employed be essentially impervious to hydrocarbon emissions due to permeation through the tubing. It is anticipated that future Federal and state regulations will fix the limit for permissible hydrocarbon emissions due to permeation through such lines. Regulations which will be enacted in states such as California will fix the total passive hydrocarbon emission for a vehicle at 2 $g/m^2$ per 24 hour period as calculated by evaporative emission testing methods such as those outlined in Title 13 of the California Code of Regulations, section 1976, proposed amendment of Sep. 26, 1991. To achieve the desired total vehicle emission levels, a hydrocarbon permeation level for the lines equal to or below 0.5 $g/m^2$ per 24 hour period would be required.

Finally, it is imperative that the fuel line employed be impervious to interaction with corrosive materials present in the fuel such as oxidative agents and surfactants as well as additives such as ethanol and methanol.

Various types of tubing have been proposed to address these concerns. In general, the most successful of these have been co-extruded multi-layer tubing which employ a relatively thick outer layer composed of a material resistant to the exterior environment. The innermost layer is thinner and is composed of a material which is chosen for its ability to block diffusion of materials such as aliphatic hydrocarbons, alcohols and other materials present in fuel blends, to the outer layer. The materials of choice for the inner layer are polyamides such as Nylon 6, Nylon 6.6, Nylon 11, and Nylon 12.

Alcohol and aromatics in the fluid conveyed through the tube diffuse at different rates through the tubing wall from the aliphatic components. The resulting change in the composition of the liquid in the tubing can change the solubility thresholds of the material so as, for example, to be able to crystalize monomers and oligomers of materials such as Nylon 11 and Nylon 12 into the liquid. The presence of copper ions, which can be picked up from the fuel pump, accelerates this crystallization. The crystallized precipitate can block filters and fuel injectors and collect to limit travel of the fuel-pump or carburetor float as well as build up on critical control surfaces of the fuel pump.

In U.S. Pat. No. 5,076,329 to Brunnhofer, a five-layer fuel line is proposed which is composed of a thick outer layer formed of Nylon 11 or Nylon 12, a thick intermediate layer of Nylon 6, and a thin intermediate bonding layer between and bonded to the intermediate and outer layers formed of a polyethylene or a polypropylene. On the interior of the tube is an inner layer of Nylon 6 with a thin intermediate solvent-blocking layer formed of an ethylene-vinyl alcohol copolymer transposed between. The use of Nylon 6 in the inner fluid contacting surface is designed to eliminate at least a portion of the monomer and oligomer dissolution which occurs with Nylon 11 or Nylon 12.

In U.S. Pat. No. 5,038,833 to Brunnhofer, a three-layer fuel line is proposed in which a tube is formed having a co-extruded outer wall of Nylon 11 or Nylon 12, an intermediate alcohol barrier wall formed from an ethylene-vinyl alcohol copolymer, and an inner water-blocking wall formed from a polyamide such as Nylon 11 or Nylon 12. In DE 40 06 870, a fuel line is proposed in which an intermediate solvent barrier layer is formed of unmodified Nylon 6.6 either separately or in combination with blends of polyamide elastomers. The internal layer is also composed of polyamides; preferably modified or unmodified Nylon 6 while the outer layer is composed of either Nylon 6 or Nylon 12.

Another tubing designed to be resistant to alcoholic media is disclosed in UK Application Number 2 204 376 A in which a tube is produced which has a thick outer layer composed of polyamides such as Nylon 6 or 6.6 and/or Nylon 11 or 12 which are co-extruded with an alcohol-resistant polyolefin, a co-polymer of propylene and maleic acid.

Heretofore it has been extremely difficult to obtain tubing having sufficient characteristics of strength and durability having a Nylon 6 outer layer and to obtain satisfactory lamination characteristics between dissimilar polymer layers. While previous disclosures have suggested, in passing, multi-layer tubing having Nylon 6 outer layers, none have been effective for use in automobile vehicles due to short comings in strength and elongation properties. Thus, use of polyamides has been limited to Nylon 11 and 12. Additionally, the previous disclosures fail to address or appreciate the phenomenon of electrostatic discharge.

Electrostatic discharge can be defined as the release of electric charge built up or derived from the passage of charged particles through a medium or conduit composed of essentially non-conductive materials. The electrostatic charge is repeatedly replenished with the passage of additional volumes of fuel through the conduit. Discharge repeatedly occurs in the same localized area gradually eroding the area and leading to eventual rupture. This, in turn, leads to the danger of fire and explosion of the flammable contents of the tubing.

Thus it would be desirable to provide a tubing material which could be employed in motor vehicles which would be durable and prevent or reduce permeation of organic materials therethrough. It would also be desirable to provide a tubing material which would be essentially nonreactive with components of the liquid being conveyed therein. Finally, it would be desirable to provide a tubing material which would be capable of preventing the build-up of electrostatic discharge therein or would be capable of safely dissipating any electrostatic charge induced therein.

SUMMARY OF THE INVENTION

The present invention is a multi-layer tube which can be used on motor vehicles for applications such as in a fuel line or a vapor return or recovery line. The tube of the present invention is composed of:

a thick flexible outer tubing having an inner and an outer face, the outer tubing consisting essentially of an extrudable melt processible thermoplastic 6-carbon block polyamide having an elongation value of at least 150% and an ability to withstand impacts of at least 2 ft/lbs at temperatures below about −20° C.;

a thin intermediate bonding layer bonded to the inner face of the thick outer layer, the bonding layer consisting essentially of an extrudable melt processible thermoplastic capable of sufficiently permanent laminar adhesion to the outer tubing; and an inner hydrocarbon barrier layer bonded to the intermediate bonding layer, the inner layer consisting of an extrudable melt-processible thermoplastic capable of sufficiently permanent laminar adhesion with the intermediate bonding layer, the thermoplastic containing as a major constituent a fluoroplastic selected from the group consisting of polychlorotrifluoroethylene, ethylene tetrafluoroethylene copolymers, and mixtures thereof.

The inner hydrocarbon layer may capable of dissipating electrostatic energy, the electrostatic dissipation capacity being in a range between about $10^{-4}$ to $10^{-9}$ ohm/cm$^2$.

DESCRIPTION OF THE DRAWING

The objects, features and advantages of the present invention will become more readily apparent from the following description, reference being made to the following drawing in which: the FIG. 1 is a sectional view through a piece of tubing of the present invention.

DESCRIPTION OF THE PREFERRED EMBODIMENT

Figure 1:
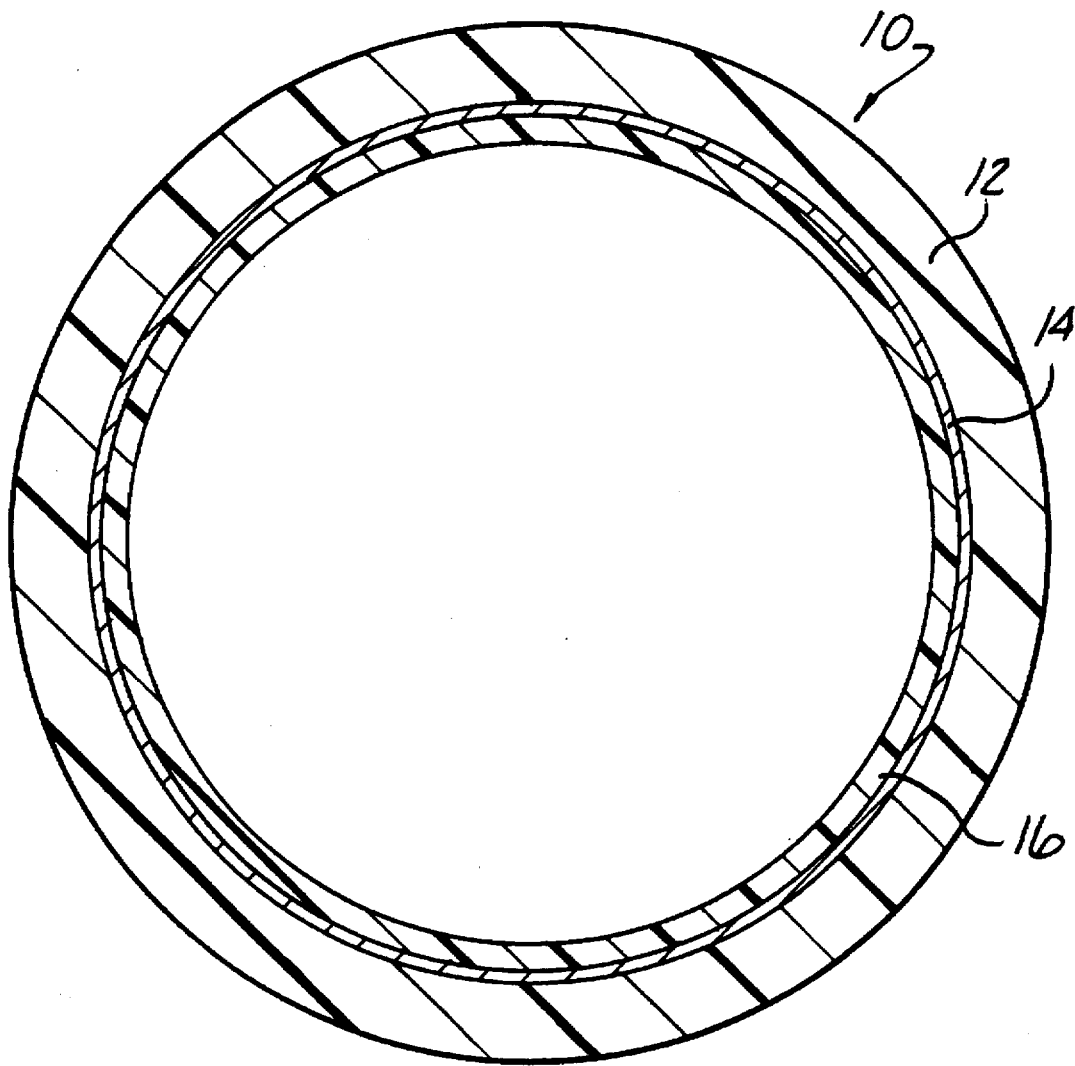
Figure 2:
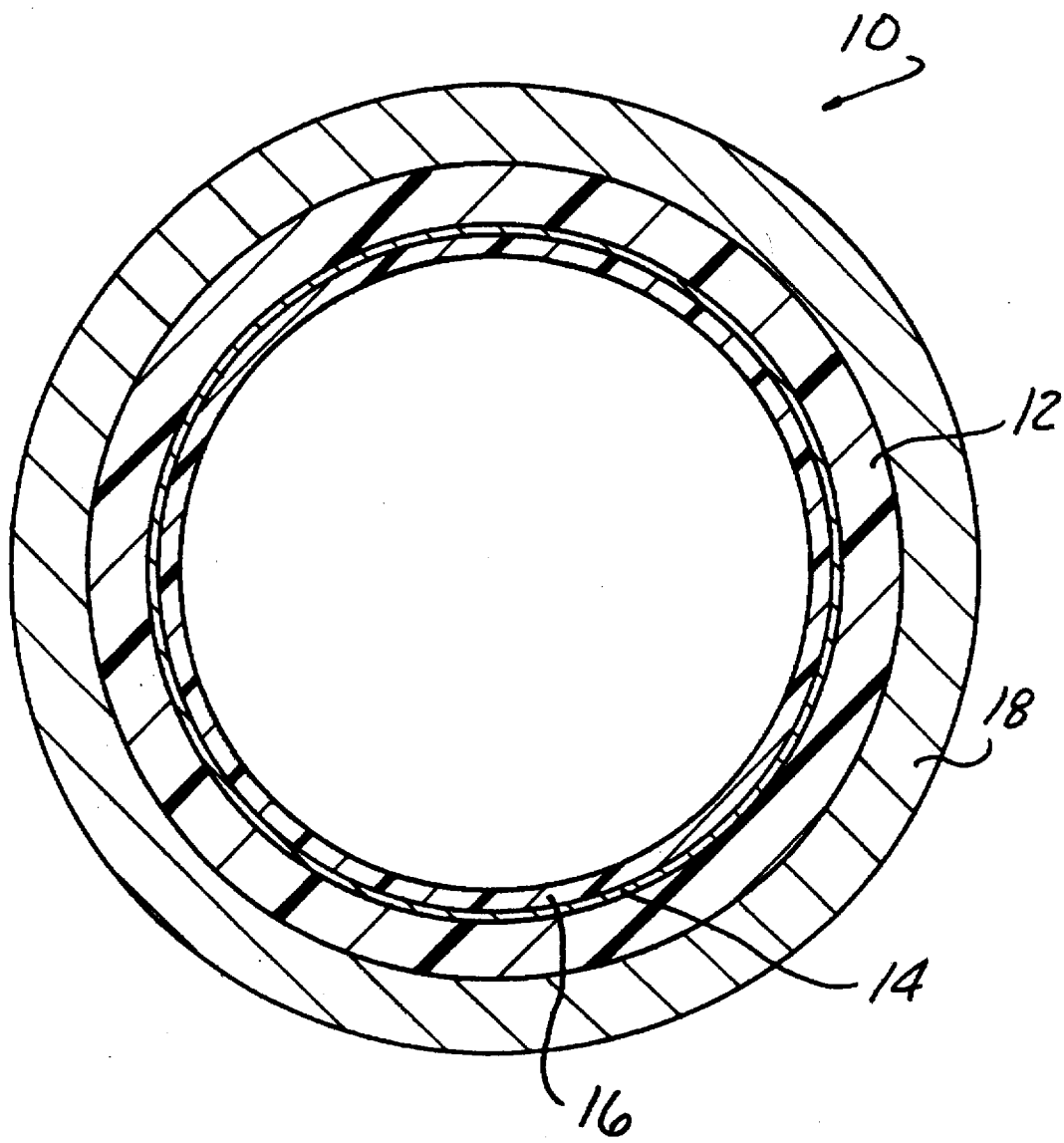
FIG. 2 is a sectional view through a piece of tubing which includes the optional jacket surrounding the outer layer of the tubing of FIG. 1.

The present invention is a multi-layer fuel line and vapor tube which contains at least one bonding layer and at least an outer and an inner tubing layer. The tubing of the present invention is, preferably, fabricated by co-extruding given thermoplastic materials in a conventional co-extrusion process. The tubing may either be co-extruded to a suitable length or may be co-extruded in continuous length and cut to fit the given application subsequently. The tubing of the present invention may have an outer diameter up to 50 mm. However, in applications such as fuel lines and vapor recovery systems, outer diameter of up to 2.5 inches are preferred.

The material may have any suitable wall thickness desired. However, in automotive systems such as those described herein, wall thicknesses between 0.5 mm and 2 mm are generally employed with wall thicknesses of approximately 0.8 to 1.5 mm being preferred. While it is within the scope of this invention to prepare a tubing material having a plurality of overlaying layers of various thermoplastic materials, the tubing of the present invention generally has a maximum of five layers inclusive of the bonding layers. In the preferred embodiment, the tubing material has three or four.

The tubing 10 of the present invention is a material which is suitable for use in motor vehicles and comprises a relatively thick outer layer 12 which is non-reactive with the external environment and can withstand various shocks, vibrational fatigue, and changes in temperature as well as exposure to various corrosive or degradative compounds to which it would be exposed through the normal course of operation of the motor vehicle.

It is anticipated that both the outer tubing layer 12 as well as any interior layers bonded thereto would be suitable for use at an outer service temperature range between about −40° C. and about 150° C., with a range of −20° C. to 120° C. being preferred. The various layers of tubing are integrally laminated to one another and resistant to delamination throughout the lifetime of the tubing. The multi-layer tubing of the present invention will have a tensile strength of no less than 25N/mm$^2$ and an elongation value of at least 150%. The tubing will have a burst strength at 23° C. and 120° C. of at least 20 bar. The multi-layer tubing of the present invention is sufficiently resistant to exposure to brake fluid, engine oil and peroxides such as those which may be found in gasoline.

The outer layer 12 may be composed of any melt-processible extrudable thermoplastic material which is resistant to ultra violet degradation, extreme changes in heat, exposure to environmental hazards such as zinc chloride, and degradation upon contact with engine oil and brake fluid. The thermoplastic material of choice has an elongation value of at least 150% and an ability to withstand impacts of at least 2 ft/lbs at temperatures below about −20° C. In general, the exterior layer consists essentially of 6-carbon block polyamides, such as Nylon 6, which either inherently exhibit sufficient resistance or contain effective amounts of suitable modifying agents to achieve such resistance to degradation upon exposure to zinc chloride.

The Nylon 6 which composes the outer layer can also be modified with various plasticizers, flame retardants and the like in manners which would be known to one reasonably skilled in the art.

In the preferred embodiment, the outer layer is composed of a polyamide thermoplastic derived from the condensation polymerization of caprolactam. Such materials are commonly referred to as 6-carbon block polyamides or Nylon 6. In the preferred embodiment, the 6-carbon block polyamide contains sufficient quantities of modifying agents to impart a level of zinc chloride resistance greater than or equal to that required by test method SAE J844: non-reactivity after 200 hour immersion in a 50% by weight aqueous zinc chloride solution. In the preferred embodiment, the 6-carbon block polyamide material is a multi-component system comprised of a Nylon-6 copolymer blended with other Nylons and olefinic compound. The zinc-chloride resistant Nylon-6 of choice will have a melt temperature between about 220° C. and 240° C. Examples of thermoplastic materials suitable for use in the tubing of the present invention are propriety materials which can be obtained commercially under the tradenames M-7551 from NYCOA Corporation and ALLIED 1779 from Allied Chemical.

The 6-carbon block polyamide may, optionally, include other modifying agents such as various plasticizing agents generally present in amounts between about 1.0% and about 13% by total weight of the thermoplastic composition as are readily known in the art. The polyamide material employed, preferably, is an impact-modified material capable of withstanding impacts of at least 2 ft. lbs. at temperatures below about −20° C.

The outer layer 12 has a wall thickness sufficient to provide suitable strength and endurance to the multi-layer tubing of the present invention. In applications involving automotive vehicles, the outer layer 12 comprises between about 50% and about 60% of the total wall thickness. In general, the outer layer has a wall thickness between about 0.5 mm and about 0.8 mm; with a preferred wall thickness between about 0.6 mm and about 0.7 mm. As indicated previously, the material can be extruded by conventional co-extrusion methods to any continuous length desired.

The inner layer 16 is integrally bonded to the inner surface of the thick outer polyamide layer 12. In the present invention, the inner layer 16 is a chemically dissimilar permeation resistant, chemical resistant, fuel resistant thermoplastic material which is melt processible in normal ranges of extrusion, i.e. about 175° to about 250° C. By the term "chemically dissimilar" it is meant that the inner layer 16 consists essentially of a non-polyamide material which is capable of adhesion to a bonding layer interposed between the thick outer layer and the inner layer in a manner which will be described subsequently.

In the preferred embodiment, the thermoplastic material which comprises the inner layer is a fluoroplastic material selected from the group consisting of polychlorotrifluoroethylene, ethylene tetrafluoroethylene copolymers, and mixtures thereof. The material employed will, preferably, have a melt temperature between about 270° C. and 560° C. and a specific gravity of 1.7.

Suitable polytrifluorochloroethylene fluoroplastic materials may be derived from the pyrolysis of chlorodifluoromethane. Suitable ethylene tetrafluoroethylene copolymers are proprietary materials. It is believed that such materials broadly have ethylene contents between about 40% and about 70%; tetrafluoroethylene contents between about 30% and about 60% by total weight of the polymer; and may contain minor amounts of other proprietary materials. Suitable material is commercially available under the tradenames "TEFZEL 210", "TEFZEL 200", and "TEFZEL 280" commercially available from L. G. dupont de Nemours, Inc. of Wilmington, Del.

The thermoplastic material employed in the inner layer is capable of serving as a hydrocarbon barrier to prevent significant permeation of the aromatic and aliphatic components of gasoline through to the polyamide outer layer of the tubing and thus, out to the surrounding environment.

In the preferred embodiment, the inner layer 16 can also exhibit conductive characteristics in that it is capable of dissipation of electrostatic charge in the range of $10^{-4}$ to $10^{-9}$ ohm/cm$^2$. The fluoroplastic material employed in the present invention may be inherently conductive in these ranges or, preferably, includes in its composition a conductive media in sufficient quantity to permit electrostatic dissipation in the range defined. The conductive media may be any suitable material of a composition and shape capable of effecting this static dissipation. The conductive material may be selected from the group consisting of elemental carbon, stainless steel and highly conductive metals such as copper, silver, gold, nickel, silicon and mixtures thereof. The term "elemental carbon" as used herein is employed to describe and include materials commonly referred to as "carbon black". The carbon black can be present in the form of carbon fibers, powders, spheres, and the like.

The amount of conductive material contained in the fluoroplastic is generally limited by considerations of low temperature durability and resistance to the degradative effects of the gasoline or fuel passing through the tubing. In the preferred embodiment, the fluoroplastic material contains conductive material in an amount sufficient to effect electrostatic dissipation. However, the maximum amount employed therein is less than 5% by volume.

The conductive material can either be blended into the crystalline structure of the polymer or can be incorporated during poymerization of monomers that make up the fluid plastic material. Without being bound to any theory, it is believed that carbon-containing materials such as carbon black may be subject to incorporation with with the surrounding fluoroplastic material. Materials such as stainless steel are more likely to be blended into the crystalline structure of the polymer.

The fluoroplastic employed in the inner layer 16 of the present invention is, preferably, chemically dissimilar in structure and composition to the outer polyamide layer. In order to accomplish effective lamination of the two dissimilar materials, the tubing of the present invention also includes at least one intermediate bonding layer 14 interposed between the two previously described layers and co-extruded therewith which is capable of achieving a suitable homogeneous bond between itself and the two respective layers. The intermediate bonding layer 14 is generally composed of a more elastic material the material employed in than inner layer.

In the preferred embodiment, the intermediate bonding layer 14 is composed of a thermoplastic material which also exhibits properties of resistance to permeation of aliphatic and aromatic materials such as those found in fuel. The thermoplastic material employed herein is preferably a melt-processible co-extrudable thermoplastic which may or may not contain various plasticizers and other modifying agents. The intermediate bonding layer 14 consists essentially of a thermoplastic material selected from the group consisting of polymers of polyvinylidine fluoride, polymers of polyvinyl fluoride, polyvinyl acetate, urethane, and mixtures thereof. The preferred fluoroplastic materials are a polyvinylidine fluoroplastics derived from the thermal dehalogenation of chlorodifluoroethane. The material of choice exhibits an affinity to conventional polymers such as Nylon 12; with polyvinylidine fluoride being the preferred fluoroplastic material and a polyvinyl acetate/urethane blend being the preferred non-fluoroplastic material. Suitable polymeric materials are commercially available under the tradenames "ADEFLON A" and "ADEFLON D" from Atochem Inc. elf Aquitaine Group of Philadelphia, Penn.

The intermediate bonding layer 14, in addition to permitting a homogeneous bond between the inner and outer layers and exhibiting resistance to permeation of fuel components, also may exhibit conductive or static dissipative characteristics such as those described previously. Thus, the intermediate bonding layer 14 may, optionally, include sufficient amounts of a conductive media to effect electrostatic dissipation in the range of $10^{-4}$ to $10^{-9}$ ohm/cm$^2$. As with the inner layer, the intermediate bonding layer may be inherently electrostatically dissipative or may be rendered so by the inclusion of certain conductive material such as those selected from the group consisting of elemental carbon, stainless steel, copper, silver, gold, nickel, silicon and mixtures thereof.

In the preferred embodiment, the inner layer 16 and the bonding layer 14 are maintained at the minimum thickness to prevent permeation of the fuel through the tubing material. It is preferred that the amount of hydrocarbon permeation be no greater than 0.5 g/m$^2$ in a 24 hour interval. It is anticipated that the thickness of the inner and intermediate layers can be modified to accomplish this end.

In the preferred embodiment, the inner layer has the minimum wall thickness sufficient to achieve the permeation resistance desired. In general, the inner layer is thinner than the outer layer with the thickness of the outer layer being between about 50% and about 60% of the total wall thickness of the tubing. In the specified embodiment, the inner wall thickness is between about 0.05 mm and about 0.2 mm with a thickness of about 0.05 mm to about 0.17 mm being preferred. The intermediate bonding layer generally may have a thickness less than or equal to that of the inner layer.

The intermediate bonding layer is of sufficient thickness to permit an essentially homogeneous bond between the inner and outer layers. In general, the intermediate bonding layer can be thinner than the other two layers and can constitute between about 5% and about 20% of the total wall thickness. In the specified embodiment, the thickness of the intermediate bonding layer is between about 0.05 mm and about 0.2 mm with a thickness between about 0.05 mm and about 0.15 mm being preferred.

The total wall thickness of the tubing of the present invention is generally between about 0.5 mm and about 2.0 mm with a wall thickness between about 0.8 and about 1.25 mm being preferred.

The tubing of the present invention may also, optionally include an outer jacket 18 which surrounds the outer layer. The outer jacket 18 may be either co-extruded with the other layers during the extrusion process or may be put on in a subsequent process such as cross-extrusion. The outer jacket may be made of any material chosen for its structural or insulating characteristics and may be of any suitable wall thickness. In the preferred embodiment, the outer jacket may be made of a thermoplastic material selected from the group consisting of zinc-chloride resistant Nylon 6, Nylon 11, Nylon 12, polypropylene, and thermoplastic elastomers such as SANTOPRENE, a proprietary thermoplastic rubber composition commercially available from Advance Elastomer Systems of St. Louis Mo. KRATON, a proprietary thermoplastic rubber composition composed of a styrene-ethylene/butylene-styrene block copolymer commercially available from Shell Chemical Co of Houston Tex., VICHEM a proprietary family of polyvinyl chloride compounds commercially available from Vichem Corporation and SARLINK a proprietary oil resistant thermoplastic rubber composition commercially available from Novacor Chemicals Leominster, Mass. If desired, these materials may be modified to include flame retardants, plasticizers and the like.

What is claimed is:

1. A layered tubing for use in a motor vehicle, the tubing comprising:
    a thick flexible outer layer having an inner and an outer face, the outer layer consisting essentially of an extrudable thermoplastic 6-carbon block polyamide having an elongation value of at least 150% and an ability to withstand impacts of at least 2 ft/lbs at temperatures below about −20° C.;
    a thin intermediate bonding layer bonded to the inner face of the thick outer layer, the bonding layer consisting essentially of an extrudable melt processible thermoplastic capable of sufficiently permanent laminar adhesion to the inner face of the outer tubing; and
    an inner hydrocarbon barrier layer bonded to the intermediate bonding layer, the inner layer consisting of an extrudable, melt-processible thermoplastic capable of sufficiently permanent laminar adhesion with the intermediate bonding layer, the melt-processible thermoplastic consisting essentially of a fluoroplastic selected from the group consisting of polychlorotrifluoroethylene, ethylene tetrafluoroethylene copolymers and mixtures thereof.

2. The tubing of claim 1 wherein the inner hydrocarbon barrier layer is capable of dissipating electrostatic energy, the electrostatic dissipation capacity being in a range between about $10^{-4}$ to $10^{-9}$ ohm/cm$^2$.

3. The tubing of claim 1 wherein the inner hydrocarbon layer contains quantities of a conductive material sufficient to provide electrostatic dissipation capability in a range between about $10^{-4}$ to $10^{-9}$ ohm/cm$^2$.

4. The tubing of claim 3 wherein the conductive material is selected from the group consisting of elemental carbon, copper, silver, gold, nickel, silicon, and mixtures thereof.

5. The tubing of claim 4 wherein the conductive material is present in an amount less than about 5% by volume of the polymeric material.

6. The tubing of claim 4 wherein the conductive material is blended into the milling process fluoroplastic material.

7. The tubing of claim 4 wherein the conductive material is elemental carbon and is incorporated during polymerization of monomers that make up the extrudable fluoroplastic material.

8. The tubing of claim 1 wherein the extrudable thermoplastic polyamide of the thick outer layer is a derived by the condensation polymerization of caprolactam.

9. The tubing of claim 8 wherein the extrudable thermoplastic polyamide of the thick outer layer consists essentially of zinc-chloride resistant Nylon 6.

10. The tubing of claim 1 wherein the thermoplastic material employed in the intermediate bonding layer exhibits at least some resistance to interaction with short-chain hydrocarbon molecules present in material conveyed through the tubing.

11. The tubing of claim 10 wherein the thermoplastic material employed in the intermediate bonding layer includes as a major constituent an extrudable, melt processible thermoplastic selected from the group consisting of polyvinylidine fluoride, polyvinyl fluoride, blends of polyvinyl acetate and urethane, and mixtures thereof.

12. The tubing of claim 1 further comprising an exterior jacket overlying the thick outer tubing, the exterior jacket composed of a material consisting essentially of a thermoplastic rubber selected from the group consisting of Nylon 11, Nylon 12, zinc chloride resistant Nylon 6, Santoprene, Kraton, Vichem, Sarlink and mixtures thereof.

13. A layered tubing for use in a motor vehicle, the tubing comprising:
    a thick outer layer having an inner and an outer face, the outer layer consisting essentially of an extrudable zinc chloride resistant 6-carbon block polyamide having an elongation value of at least 150% and an ability to withstand impacts of at least 2 ft/lbs at temperatures below about −20° C.;
    an intermediate bonding layer having a thickness between about 0.05 mm and about 0.2 mm bonded to the inner face of the thick outer layer, the bonding layer consisting essentially of an extrudable thermoplastic capable of sufficiently permanent laminar adhesion to the polyamide outer tubing; and
    an inner hydrocarbon barrier layer bonded to the intermediate bonding layer having a thickness between about 0.05 mm and about 0.2 mm, the inner layer consisting essentially of an extrudable, melt process fluoroplastic capable of sufficiently permanent laminar adhesion with the intermediate bonding layer selected from the group consisting of polychlorotrifluoroethylene, ethylene tetrafluoroethylene copolymers, and mixtures thereof.

14. The tubing of claim 13 further comprising an exterior jacket overlying the thick outer tubing, the exterior jacket composed of a material consisting essentially of a thermoplastic rubber selected from the group consisting of Nylon 11, Nylon 12, zinc chloride resistant Nylon 6, Santoprene, Kraton, Vichem, Sarlink, polypropylene and mixtures thereof.

15. The tubing of claim 13 wherein the thermoplastic material of the inner hydrocarbon barrier layer is capable of dissipating electrostatic energy, the electrostatic dissipation capacity being in a range between about $10^{-4}$ to $10^{-9}$ ohm/cm$^2$.

16. The tubing of claim 13 wherein the thermoplastic material of the inner hydrocarbon barrier layer contains quantities of a conductive material sufficient to provide electrostatic dissipation capacity in a range between about $10^{-4}$ to $10^{-9}$ ohm/cm$^2$.

17. The tubing of claim 16 wherein the conductive material is selected from the group consisting of elemental carbon, copper, silver, gold, nickel, silicon, and mixtures thereof and is present in an amount less than about 5% by volume of the extrudable thermoplastic material.

18. The tubing of claim 16 wherein the conductive material is blended into the melt processible fluoroplastic material.

19. The tubing of claim 16 wherein the conductive material is elemental carbon and is incorporated during polymerization of monomers that make up the extrudable fluoroplastic material.

20. The tubing of claim 13 wherein the extrudable thermoplastic of the intermediate bonding layer is a thermoplastic selected from the group consisting of polyvinylidine fluoride, polyvinyl fluoride, blends of polyvinyl acetate and urethane, and mixtures thereof.

* * * * *

UNITED STATES PATENT AND TRADEMARK OFFICE
CERTIFICATE OF CORRECTION

PATENT NO. : 5,678,611
DATED : October 21, 1997
INVENTOR(S) : D. Noone et al.

It is certified that error appears in the above-identified patent and that said Letters Patent is hereby corrected as shown below:

Column 3,
Line 25, after "between about" please delete "$10^{-4}$ to $10^{-9}$ ohm/cm$^2$" and insert -- $10^4$ to $10^9$ ohm/cm$^2$ --.

Column 5,
Lines 43-44, please delete "$10^{-4}$ to $10^{-9}$ ohm/cm$^2$" and insert -- $10^4$ to $10^9$ ohm/cm$^2$ --.

Column 6,
Line 47, after "in the range of" please delete "$10^{-4}$ to $10^{-9}$ ohm/cm$^2$" and insert -- $10^4$ to $10^9$ ohm/cm$^2$ --.

Column 8,
Lines 2 and 6, after "between about" please delete "$10^{-4}$ to $10^{-9}$ ohm/cm$^2$" and insert -- $10^4$ to $10^9$ ohm/cm$^2$ --.

Column 9,
Lines 9 and 15, after "in a range between about" please delete "$10^{-4}$ to $10^{-9}$ ohm/cm$^2$" and insert -- $10^4$ to $10^9$ ohm/cm$^2$ --.

Signed and Sealed this

Second Day of September, 2003

JAMES E. ROGAN
*Director of the United States Patent and Trademark Office*